United States Patent
Ishiguro et al.

(10) Patent No.: US 7,062,230 B1
(45) Date of Patent: Jun. 13, 2006

(54) COMMUNICATION DEVICE, IMAGE-PICKUP DEVICE, STORAGE MEDIUM AND COMMUNICATION METHOD

(75) Inventors: Satoshi Ishiguro, Tokyo (JP); Hiraku Sonobe, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/406,697

(22) Filed: Sep. 28, 1999

(30) Foreign Application Priority Data

Sep. 30, 1998 (JP) ................................. 10-278633
Aug. 24, 1999 (JP) ................................. 11-237191

(51) Int. Cl.
H04B 1/02 (2006.01)

(52) U.S. Cl. ..................... 455/91; 455/66.1; 455/344; 455/557; 348/211.1

(58) Field of Classification Search ............. 455/556.1, 455/556.2, 557, 566, 91, 414.1, 66.1, 344, 455/466, 552.1; 348/211.1, 211.2, 211.3, 348/231.1–231.9
See application file for complete search history.

(56) References Cited

U.S. PATENT DOCUMENTS

| | | | | |
|---|---|---|---|---|
| 5,533,097 A | * | 7/1996 | Crane et al. | 455/557 X |
| 5,666,159 A | * | 9/1997 | Parulski et al. | 348/211.2 |
| 5,806,005 A | * | 9/1998 | Hull et al. | 455/566 |
| 5,893,037 A | * | 4/1999 | Reele et al. | 455/556.1 |
| 5,909,648 A | * | 6/1999 | Boudreaux et al. | 455/466 X |
| 6,122,521 A | * | 9/2000 | Wilkinson et al. | 455/457 |
| 6,249,681 B1 | * | 6/2001 | Virtanen | 455/466 |
| 6,826,400 B1 | * | 11/2004 | Cashman et al. | 455/552.1 X |

FOREIGN PATENT DOCUMENTS

| | | |
|---|---|---|
| JP | 05-167965 | 7/1993 |
| JP | 06-133081 | 5/1994 |
| JP | 11-237191 | 1/2004 |

* cited by examiner

Primary Examiner—Nay Maung
Assistant Examiner—Philip J. Sobutka
(74) Attorney, Agent, or Firm—Fitzpatrick, Cella, Harper & Scinto

(57) ABSTRACT

A communication device is provided which is capable of transmitting pickup images efficiently with high portability, manipulativity, and instantaneous response. A control apparatus starts a communication (such as a radio transmission) operation in a communication apparatus simultaneous with an image pickup operation in an image pickup operation when the operation is initiated by a user in a communication device having the image pickup function. Thereby, the pickup images obtained in the image pickup operation are automatically transmitted to a specified transmission destination via a communication apparatus. Thus, a user can obtain and transmit pickup images to a desired transmission destination simultaneously by simply setting the operating mode of the device to a predetermined mode or the like.

4 Claims, 16 Drawing Sheets

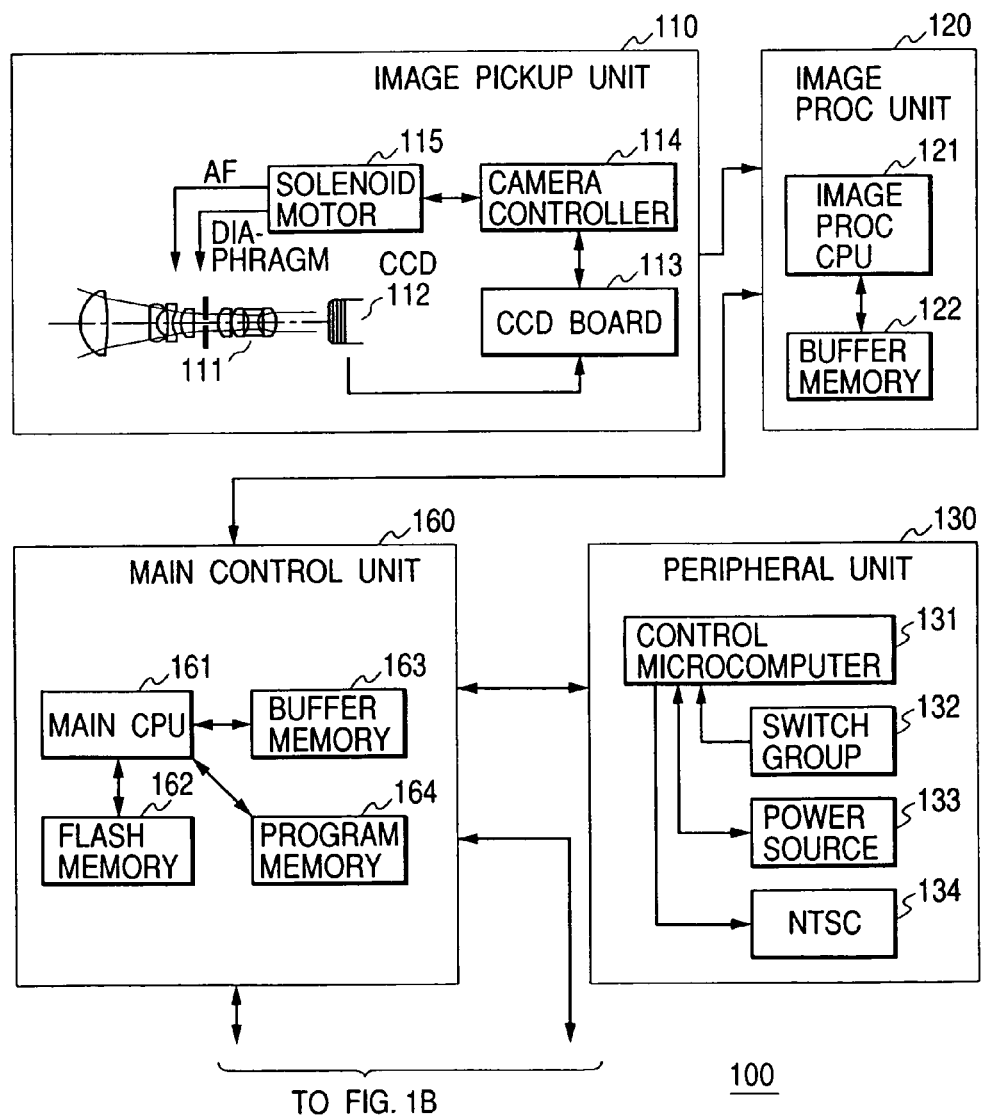

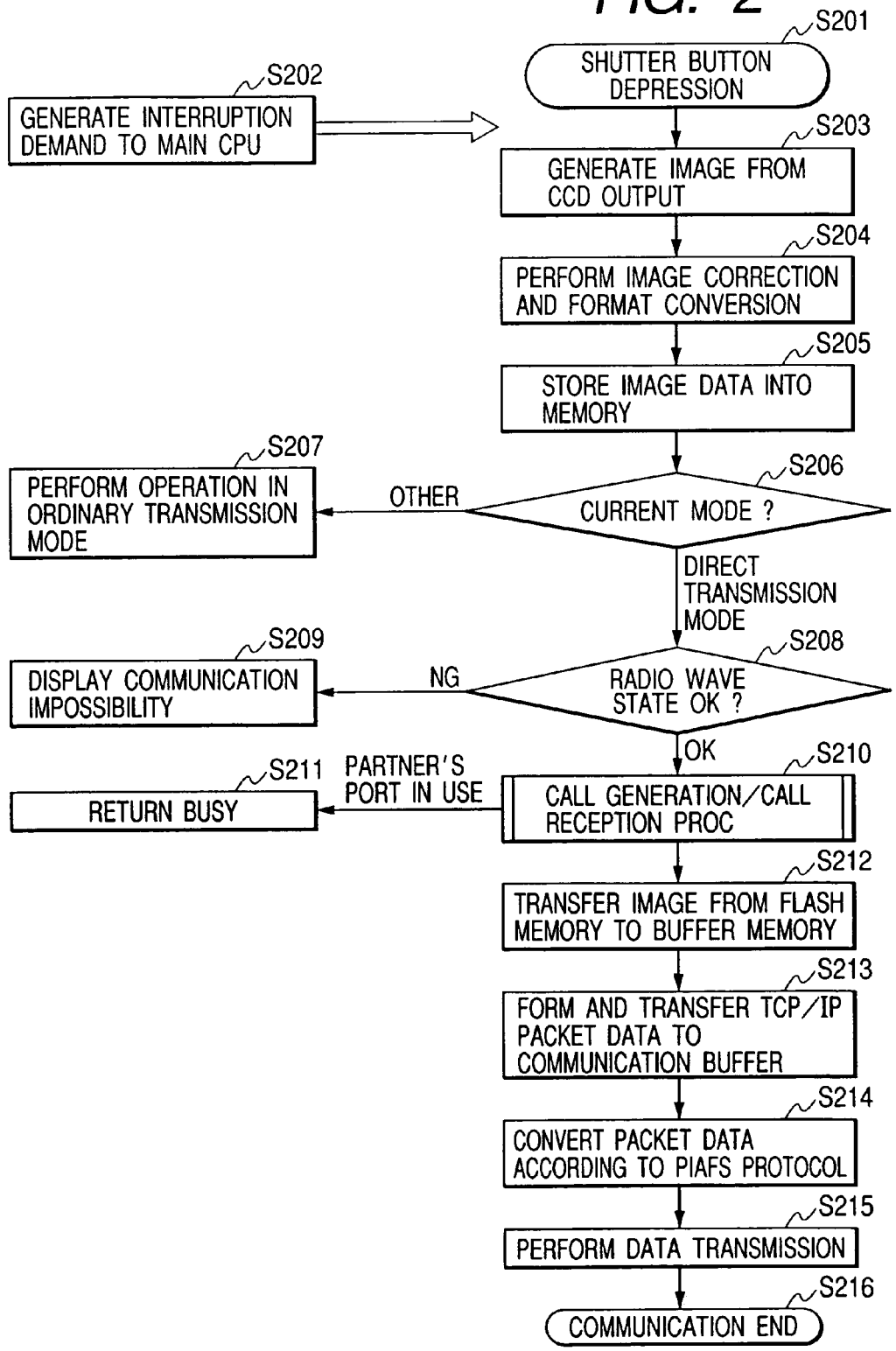

INTERVAL SET MODE

○ ECONOMY
BUSINESS
USER SETTING

△▽ ······ SELECT   ○ ······ OK   X ······ CANCEL

INTERVAL SET MODE
ECONOMY SETTING

SERVER : TOKYO

| 8:00–19:00 | −20 km | 20–30 km | 30–60 km | 60–100 km | 100– km |
|---|---|---|---|---|---|
| 19:00–23:00 | 60 | 45 | 36 | 14 | 14 |
| 23:00– | 60 | 45 | 36 | 20 | 4 |
| SAT, SUN, HOLY | 90 | 60 | 45 | 23 | 16.5 |

313   ○ ······ OK   X ······ CANCEL

INTERVAL SET MODE
BUSINESS SETTING

SELECT INTERVAL TIME

30   ○45   60   90

△▽ ······ SELECT   ○ ······ OK   X ······ CANCEL

FIG. 8

| 431 | 432 | 433 | 434 | 435 | |
|---|---|---|---|---|---|
| NO. 1 | 99/06/01 10:20 | START ADDRESS 00000000 | END ADDRESS 0000FFFF | 640*480 F2.0 1/60 AUTO | WAIT — 435a |
| NO. 2 | 99/06/01 10:21 | START ADDRESS 00010000 | END ADDRESS 0001FFFF | 640*480 F4.0 1/60 AUTO | WAIT |
| NO. 3 | 99/06/01 10:21 | START ADDRESS 00020000 | END ADDRESS 0002FFFF | 1024*768 F2.8 1/30 DAY | WAIT |
| NO. 4 | 99/06/01 10:23 | START ADDRESS 00030000 | END ADDRESS 0003FFFF | 1024*768 F4.0 1/60 DAY | WAIT |

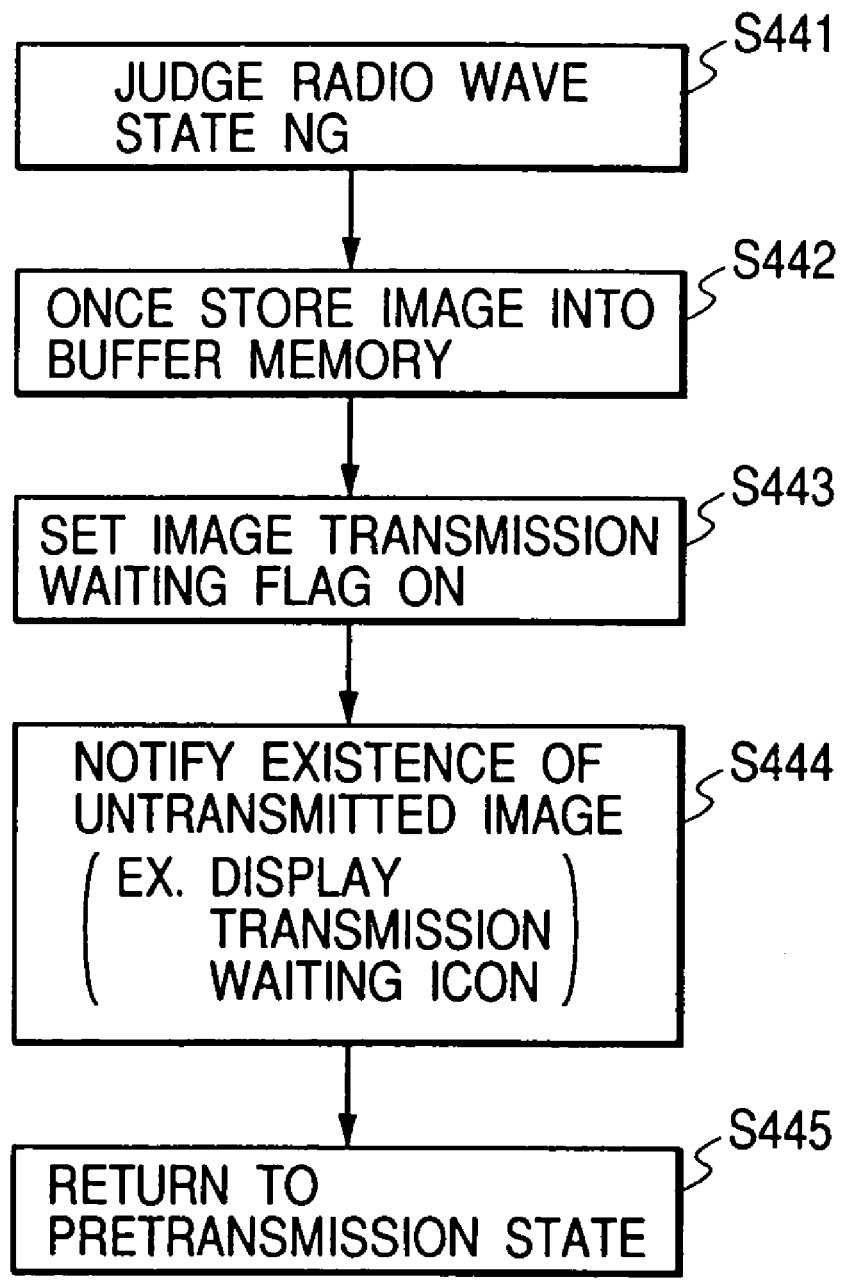

COMMUNICATION DEVICE, IMAGE-PICKUP DEVICE, STORAGE MEDIUM AND COMMUNICATION METHOD

BACKGROUND OF THE INVENTION

1. Field of the Invention

The present invention relates to a device or system for image-pickup and communication. In particular the present invention relates to a device or system for radio transmission of an image obtained by the image pick-up function of the device or system.

2. Related Background Art

Prior to the present invention, radio transmission of a picture or image from a digital camera or the like to a second device, such as a remote server, using a communication device, such as portable phone or PHS (Personal Handyphone System), required the connection of devices, as illustrated in FIG. 12.

As shown in FIG. 12, for example, a digital camera 501 is connected to a personal computer (hereinafter, referred to as "PC") 502, such as a notebook computer, using a cable 504 (or a PC card), and the PC 502 is connected to a portable phone 503 using a cable 508. Then, the pickup image obtained with the digital camera 501 is transferred to the portable phone 503 through the PC 502. As shown in FIG. 13, the pickup image is then transmitted by the portable phone 503 via a general public network 506 to a remote server 507.

Although such a method was advantageous in that a digital camera and portable phone could be utilized without any substantial modification, the combination of devices is so complicated that it interferes with at least one of the portability and manipulativity of the digital camera.

To solve the problems associated with the prior art method, a composite device (or multifunctional device) 510, as shown in FIG. 14, has been proposed. The proposed composite device 510 has the image-pickup capability of a digital camera or the like and the communication capability of a portable phone, a PHS or the like.

As shown in FIG. 14, the composite device 510 comprises a lens 511 for focusing light rays onto an image pickup element, such as a CCD, a shutter button (shutter) 512, a switch group 513, comprising a plurality of switches, a color LCD (Liquid Crystal Display) 514 for displaying the pickup image obtained by the image pickup element and an antenna 515.

The process for photographing a subject, and transmitting the pickup image to a server by telephone may be executed according to the flow charts provided in FIGS. 15 and 16.

First, as illustrated in FIG. 15, the composite device 510 is set to the photographing mode by setting the required switch in the switch group 513, and the photographing operation is initiated by depressing the shutter 512 at the desired time in step S521.

As a result, an interruption occurs in the composite device 510 in step S522, and the pickup image signal of the subject obtained with a pickup element is stored in an image buffer memory in step S523.

After various corrections of brightness, white balance or the like, the format of the pickup image signal stored in the image buffer memory is converted to the JPEG format or the like in step S524.

The converted pickup image data is then stored in memory in step S525.

Next, as illustrated in See FIG. 16 for image pickup data that are transmitted from the composite device 510 to a remote server, a user sets the composite device 510 to the transmit mode by manipulating the required switch in the switch group 513 in step S531.

In the alternative, instead of manipulating the required switch in the switch group 513, a mode-switching operation may be performed on the menu screen of the color LCD 514, or step S531 may be executed after step S534 discussed below.

In the transmit mode, the composite device 510 reads the pickup image data stored in the store memory in step S532, and the readout pickup image data are displayed on the color LCD 514 in step S533.

By manipulating the desired switch in the switch group 513, a user selects an image to be transmitted from the pickup image data screen-displayed on the color LCD 514 in step S534. Any or all of the images stored in the store memory may be selected for transmission.

By manipulating the required switch in the switch group 513, a user selects the partner server to which the image selected in step S534 is to be transmitted in step S535. The server to which the pickup image is to be transmitted may be selected from the phone book data stored in the composite device 510, or the phone number of the server may be input directly using the switch group 513 or the like.

The composite device 510 confirms the image to be transmitted and the transmission destination when the user performs steps S534 and S535 in step S536. As a result, upon receipt of an "OK" from the user by means of a switch in the switch group 513 or the like, the transmission of the image is executed.

However, if the user provides the instruction "NO", the composite device 510 returns to step S534 for the determination of an image to be transmitted.

Depending on the type of composite device 510 (for example, if the communication function of the device is PHS, a transmission control procedure like "PIAFS: PHS Internet Access Forum Standard"), a call is placed with the public network in step S537. In response, an OK or NG signal is sent back from the call destination server.

If reception of the call is confirmed by an OK signal from the server in step S538, an inter-device connection between the composite device 510 and the server is established after a mutual negotiation processing in step S539.

When the negotiation between the composite device 510 and the server is completed, and the communication according to a protocol such as TCP/IP (Transmission Control Protocol/Internet Protocol) becomes possible, transmission of the image selected at step S534 to the server is executed by the composite device 510 in step S540. Error processing, retransmit processing, or the like is performed at this time according to the procedure or protocol, depending on the type of a composite device 510, at step S537, until all of the selected images are transmitted, or the communication with the server ends in step S541 upon receipt of a receive end signal from the server in step S542.

On the other hand, if connection with the server is not possible in step S538, such as, as a result of the server being busy or the like, in step S543, the composite device 510 displays a message on the screen display to this effect in step S544.

In this case, to transmit the image, a user must again attempt to connect with the remote server after a period of time.

In addition, a composite device 510 of the type proposed, and as shown in FIG. 14, can provide an instant response to the transmission of an image, if requested, in addition to providing portability and manipulativity, making the transmission of a photographic image as simple and easy as possible.

With the proposed composite device 510, however, a user is required to perform at least three switching operations in step S531 (changing mode), step S534 (selecting manipulation the image for transmission), and step S535 (selecting a transmission destination) to transmit the pickup image obtained in the photographing mode to the server as shown in FIG. 16.

There is no problem with this procedure when an instantaneous response is not required, such as in the case of the later transmission of a collection of accumulated photograph images, but becomes very troublesome, for example, in the case where it is desired to transmit only one image to a server, or in similar cases.

In addition, in a case where it is desired to transmit successive photographed images to a server during the continuous photography of images, rather than a single image only, the photography must be interrupted for each transmission, and, thus, the possibility of missing a a photograph during this interruption exists.

SUMMARY OF THE INVENTION

It is one object of the present invention to solve all or at least one of the problems mentioned above.

It is another object of the present invention to reduce the problems associated with transmitting image data.

Furthermore, it is still another object of the present invention to transmit an image without interfering with the instantaneous response of the image pickup means.

In accordance with these objects, one preferred embodiment of the present invention is directed to a communication device connected to an image pickup unit for photographing a subject. The device includes: (1) an input unit adapted to input images from the image pickup unit; (2) a communicative unit adapted to transmit the pickup images inputted by the input unit to a transmission destination in communication therewith; and (3) a control unit adapted to start an operation of the communicative unit in response to the image pickup operation of the image pickup unit. The control unit controls the communicative unit so as to make a break in communication with the transmission destination after a lapse of a predetermined time period from the time when the transmission of the pickup image is completed. The lapse of the predetermined time period can be arbitrarily set by a user, and setting of the lapse of the predetermined time period is performed by selecting from among plural modes displayed on a display unit.

Still further, it is an object of the present invention to provide an image pickup unit having a communicative function to transmit pickup images obtained by picking up images of a subject. The unit includes a manipulative unit adapted to instruct a predetermined operation and a control unit adapted to start the image pickup operation and an operation of the communicative function on the basis of the instruction of a predetermined operation by the manipulative unit. The control unit controls execution of the communicative function so as to make a break in communication with a transmission destination after a lapse of given time a predetermined time period from the time when the transmission of the pickup image is completed. The lapse of the predetermined time period can be arbitrarily set by a user, and setting of the lapse of the predetermined time period is performed by selecting from among plural modes displayed on a display unit.

Furthermore, another aspect of the present invention is a storage medium in which a processing step for transmitting pickup images obtained by photographing a subject to a specified transmission destination is stored so as to be readable by a computer. The processing step includes a step of starting an image pickup operation of picking up the image of the subject and a communicating operation with the transmission destination on the basis of instructions of a predetermined operation given from a user to transmit the pickup images obtained by the image pickup operation to the transmission destination. The processing step further includes a step of making a break in communication with the transmission destination after a lapse of a predetermined time period from the time when the transmission of the pickup image is completed. The lapse of the predetermined time period can be arbitrarily set by the user, and setting of the lapse of the predetermined time period is performed by selecting from among plural modes displayed on a display unit.

It is yet another object of the present invention to provide a communication method for communicating photographic images from an image pickup unit for picking up images of a subject to a transmission destination. The method includes: (1) an input step of inputting a photographed image; (2) a communicative step of transmitting the photographic image inputted in the input step to the transmission destination in communication therewith; and (3) a control step of starting execution of the communicative step in response to the image pickup operation of the image pickup unit. The control step includes controlling execution of the communicative step so as to make a break in communication with the transmission destination after a lapse of a predetermined time period from the time when the transmission of the photographic image is completed. The lapse of the predetermined time period can be arbitrarily set by a user, and setting of the lapse of the predetermined time period is performed by selecting from among plural modes displayed on a display unit.

The other objects and characteristics of the present invention will be apparent from the description of the following embodiments and drawings.

BRIEF DESCRIPTION OF THE DRAWINGS

FIG. 2 is a flow chart illustrating the transmission of a pickup image in the embodiment of FIG. 1;

FIG. 8 is an illustration of Transmission WAIT flags in the buffer memory;

FIG. 9 is a flow chart illustrating the processing of the setup of the Transmission WAIT flag;

DETAILED DESCRIPTION OF THE PREFERRED EMBODIMENTS

Figure 1B:
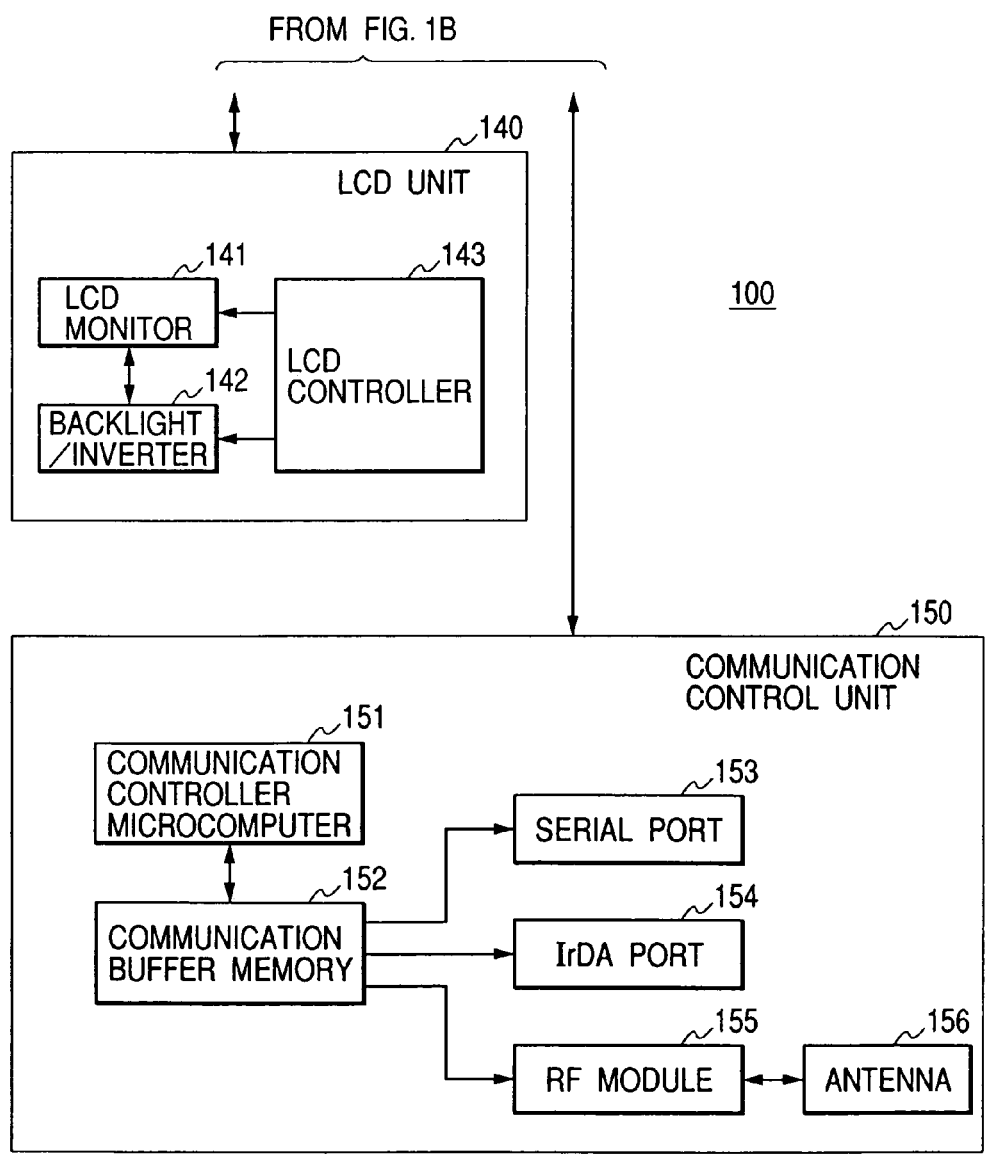
FIG. 1, which is composed of FIGS. 1A and 1B, is a block diagram showing the configuration of a composite device according to one embodiment of the present invention.

Hereinafter, the embodiments of the invention will be described referring to the drawings.

First Embodiment

The present invention, as illustrated in FIGS. 1, 1A, and 1B, is directed to a composite or multifunctional device 100, comprising a pickup device and a communication device.

Figure 14:
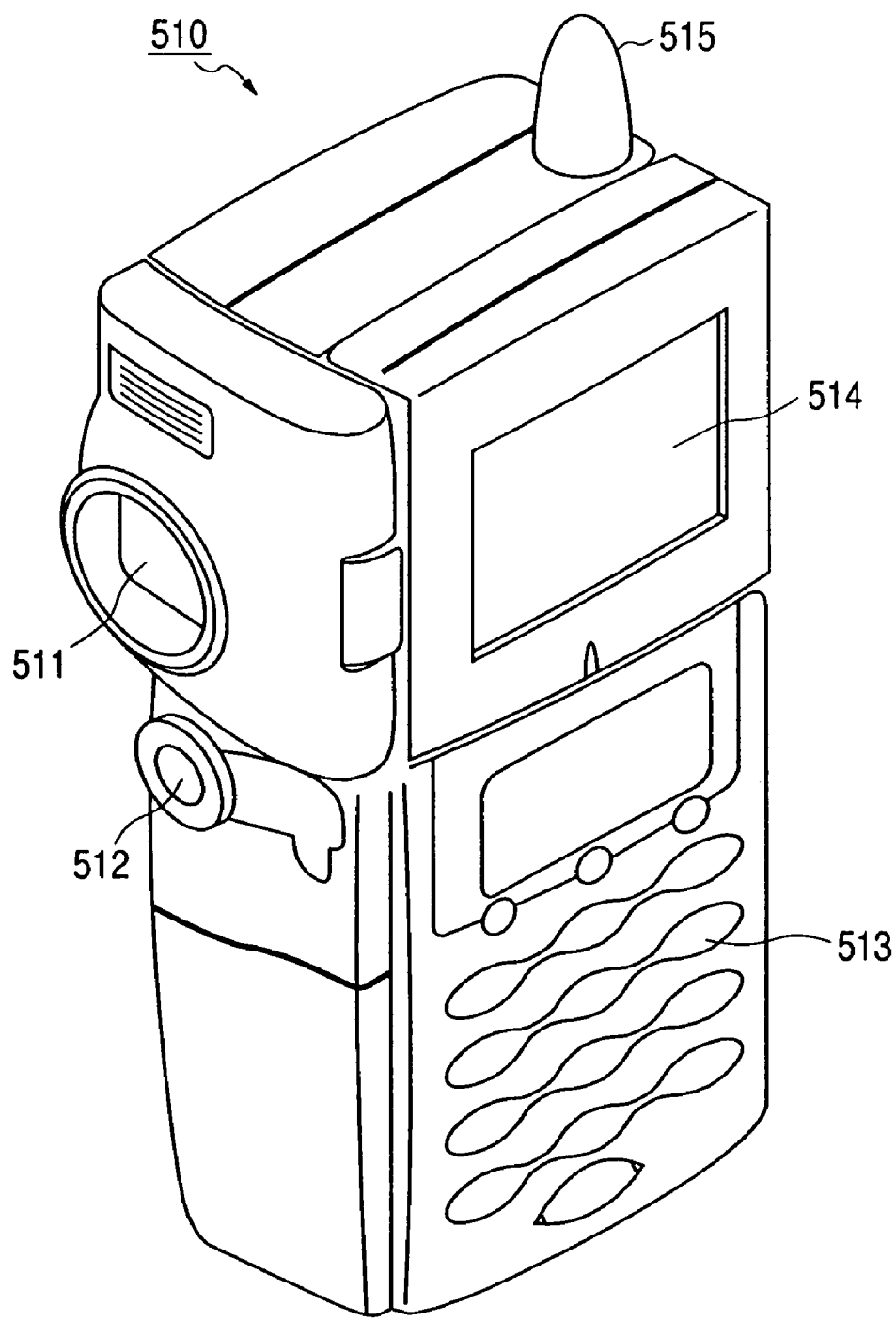
FIG. 14 is an external view of a composite device, comprising the pickup device and the communication device.
Figure 15:
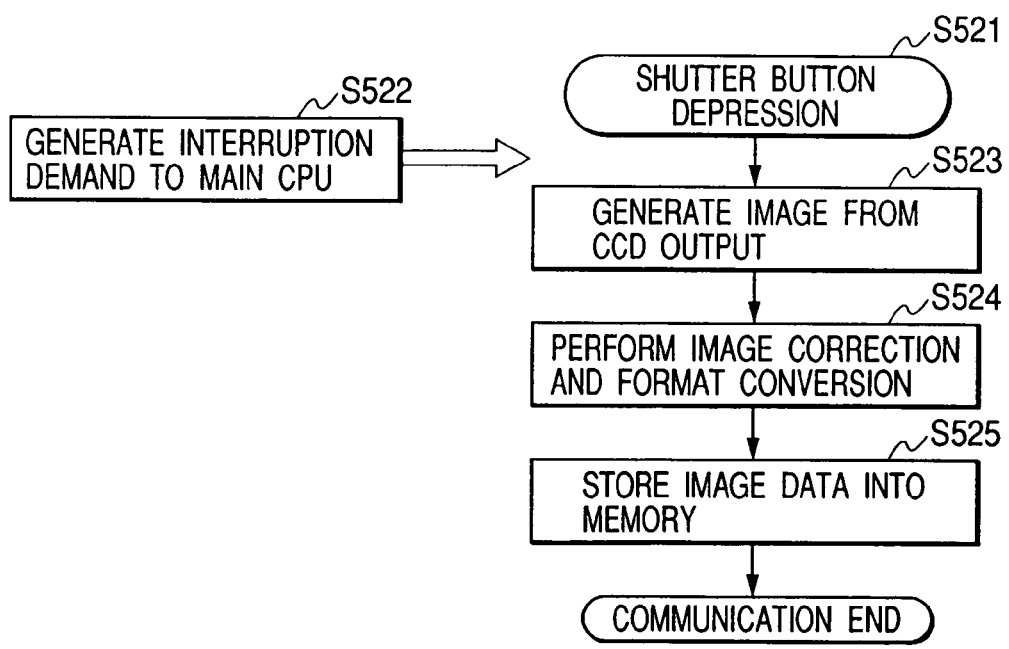
FIG. 15 is a flow chart illustrating the processing required for obtaining a pickup image with the composite device.

This composite device 100 is similar in external appearance to the prior art composite device 510 shown in FIG. 14, but differs in that the composite device 100 provides a mode that does not require the manipulation of a switch to change modes, as does the prior art composite device 510. In this mode, depressing the shutter 512 initiates an image capture operation, i.e., the taking of a photograph, in the composite device 100, and, at the same time, the automatic connection of the composite device 100 itself to a public network in such a manner as to transmit a pickup image to a remote server. Here, the relevant mode is referred to as "direct transmission mode."

Hereinafter, the composite device 100 will be specifically described.

The composite device 100 has the image pickup function of a digital camera or the like and the communication function of a PHS, a portable phone, or the like. The composite device of the invention comprises an image pickup unit 10, an image processing unit 120, a peripheral unit 130, an LCD unit 140, a communication control unit 150, and a main control unit 160, as shown in FIGS. 1A and 1B.

The image pickup unit 110 comprises a lens 111 composed of two or more lenses and a diaphragm, an image pickup element 112 (hereinafter, designated CCD) on which light rays are focused by the lens 111, a solenoid motor 115 for driving the lens 111, a CCD board 113 for driving the CCD 112, and a camera controller 114 for controlling the solenoid motor 115 and the CCD board 113. The camera controller 114 is configured to operate in accordance with the control of the main control unit 160.

The image processing unit 120 comprises an image processing CPU 121 and a buffer unit 122 for accumulating image pickup images obtained in the image pickup unit 110.

The peripheral unit 130 comprises a switch group 132, including various switches and a shutter 512, a power source unit 133 for turning the power source of the composite device 100 ON/OFF, an external input/output unit 134 for inputting/outputting an image information item from/to the outside by the NTSC scheme or the like, and a controller (control microcomputer) 131 for controlling these.

The LCD unit 140 comprises a color liquid crystal display (LCD monitor) 141 (corresponding to the color liquid crystal display 514 in FIG. 14), a backlight/inverter 142 of the LCD monitor 141, and a controller (LCD controller) 143 for controlling the display and backlight/inverter.

The communication control unit 150 is configured not only to establish the connection to the partner side by a call generation/call reception operation to a public network, determined by the composite device 100, but also to deliver image data to a network according to a protocol, such as TCP/IP, and to convert a request from the partner side into a modification control signal in the composite device 100.

For this purpose, the communication control unit 150 comprises a communication controller 151 for controlling the communication operation, a communication buffer memory 152, connected to the communication controller 151, a serial port 153, an IrDA port 154, and an RF modulator 155, each connected to the communication buffer memory 152, and a transmitter/receiver antenna 156 connected to the RF modulator 155.

The main control unit 160 serves to concentrically manage the image pickup unit 110, the image processing unit 120, the peripheral unit 130, the LCD unit 140, and the communication control unit 150, and comprises a main CPU 161, a flash memory 162 for storing pickup images or transmission destination addresses, a buffer memory 163, used for the work region or the like of image processing in the image processing unit 120, and a program memory 164 in which processing programs for various controls or the like are stored in advance. The flash memory 162, the buffer memory 163, and the program memory 164 are each connected to the main CPU 161.

With such a composite device 100, as mentioned above, an image is picked up in the image pickup unit 110, and the processing of the obtained pickup image, through its transmission to a server, is shown in the flow chart of FIG. 2. Hereinafter, this processing will be described.

A case where the composite device 100 operates under its most characteristic direct transmission mode will be specifically described.

In general, the radio transmission via a public network is largely dependent on the strength of the available radio signal, the distance from the neighboring base station, the condition of the composite device 100 itself (standing still or moving), and the like. However, for the purposes of this disclosure, these changing factors are assumed to be absent for simplicity. In addition, it is assumed that, after the connection to the transmission destination server (hereinafter, abbreviated to destination server) is established, no interruption during the communication occurs.

First, a user sets the composite device 100 to the direct transmission mode by manipulating a given switch in the switch group 132. As a result, a display indicating the direct transmission mode is displayed on the LCD monitor 14 enabling a user to easily recognize the direct transmission of the pickup image.

The manipulation of the appropriate switch at this time is recognized by the main CPU 161 in the main control unit 160 via the controller 131 in the peripheral unit 130, so that the composite device 100 operates in the direct transmission mode.

Figure 3:
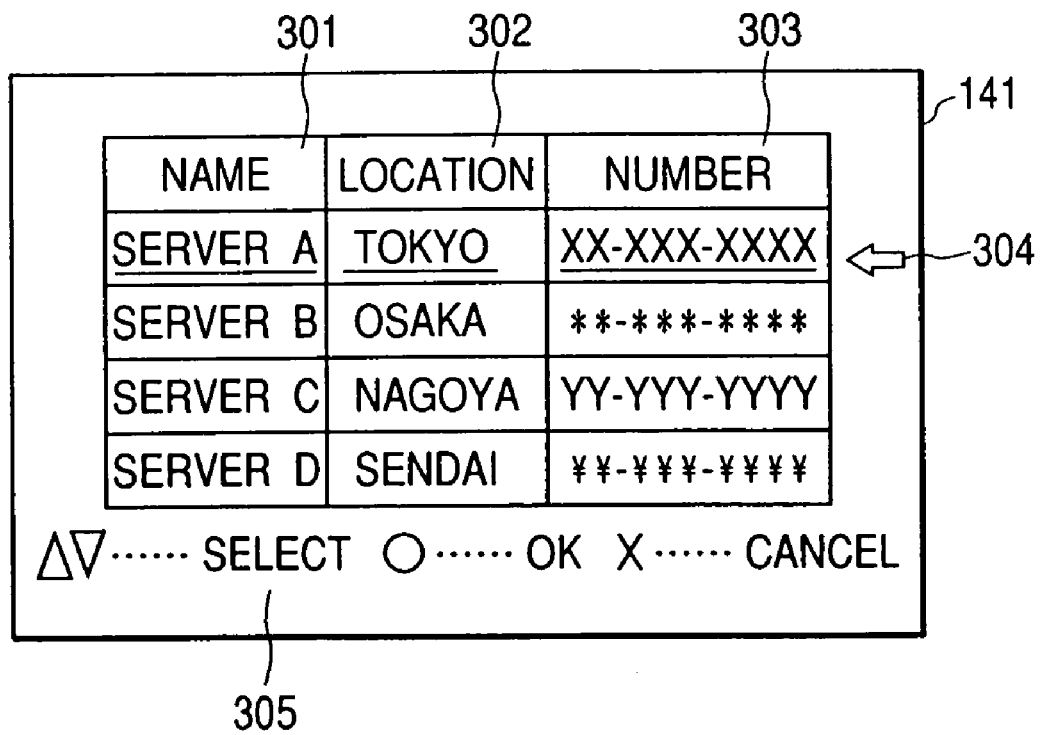
FIG. 3 is an illustration of a screen for selecting a transmission destination server in the embodiment of FIG. 1.

The user then selects the destination server from the screen (hereinafter, referred to as "transmission destination selecting screen") displayed in the LCD monitor 141 as shown in FIG. 3. The screen display at this time is under the control of the LCD controller 143.

Specifically, by manipulating a given switch in the switch group 132 or the like, a user registers the locations and phone numbers of destination servers (here, designated with server A, server B, server C, server D, . . . ) in advance. This registration information item is stored in the database configured within the flash memory 162 of the main control unit 160 via the controller 131 in the peripheral unit 130. Thus, a registered information item stored in this database is read out and displayed on the LCD monitor 141 as the transmission destination selecting screen.

As shown in FIG. 3, the transmission destination selecting screen comprises a field 301 in which to display the name of a server, a field 302 in which to display the location of a server, a field 303 in which to display the phone number of a server with a user name and a password (not displayed), and, moreover, a manipulating key unit 305, including a "SELECT" key, an "OK" key, and a "CANCEL" key, and a cursor 304.

On such a transmission destination selecting screen, a user uses various keys of the manipulation key unit 305 and a cursor 304 to select and decide the destination server. FIG. 3 shows the condition in which the "server A" is selected. Such a manipulation is recognized by the main CPU 161 in the main control unit 160 via the LCD controller 143 in the LCD unit 140.

The process of selecting the transmission destination may be performed after the switchover of the composite device 100 to the direct transmission mode or in another mode set up in advance. In either case, it is assumed that the destination server is selected before depressing the shutter 512. If the intended destination server is not selected, this condition is displayed on the LCD monitor 141 to notify the user, either at the time of the switchover to the direct transmission mode or at the time the shutter 512 is depressed. As an alternative, an alarm may be sounded to notify the user. When the transmission destination is selected, the transmission destination information is displayed together with the operation in the direct transmission mode on the LCD monitor 141, enabling a user to take a photograph while recognizing the direct transmission destination, which can prevent transmission to an erroneous destination by mistake.

In the above-mentioned manner, the composite device 100 is set to the direct transmission mode, and the destination server is selected. When the shutter 512 in the switch group 132 is depressed by a user in step S201, an interruption occurs to the main CPU 161 in the main control unit 160 via the controller 131 in the peripheral unit 130 in step S202.

As a result, an output signal (pickup image signal) of the CCD 112 in the image pickup unit 110 is transmitted to the image processing unit 120 in step S203.

In the image processing unit 120, the image processing CPU 121 stores the pickup image signal from the image pickup unit 110 once into the buffer memory 122, and the image signal is processed for brightness, white balance, and the like. The format of the pickup image signal is then converted to JPEG or the like in the main CPU 161 of the main control unit 160, subject to various corrections in the image processing unit 120, and the resultant pickup image data is stored into the flash memory 160 in steps S204 and S205.

Then, in the main control unit 160, the main CPU 161 performs a discrimination to determine the mode setting of the composite device 100 in step S206.

If the composite device 100 is found to be set to the direct transmission mode as a result of this discrimination, step S208 is executed.

Figure 16:
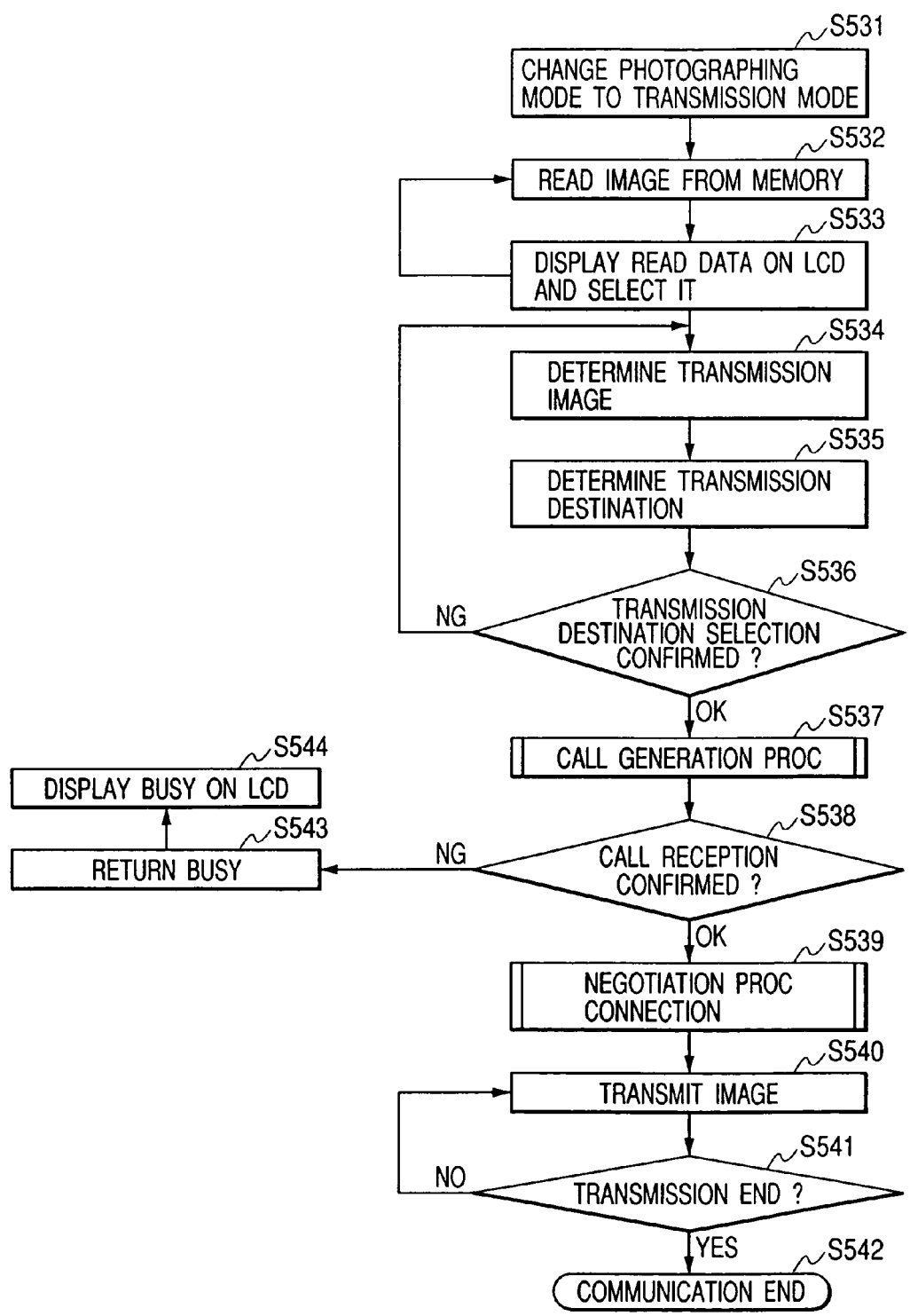
FIG. 16 is a flow chart illustrating the processing for transmitting a pickup image from the composite device.

On the other hand, if the composite device 100 is set to a mode other than the direct transmission mode, i.e., to the normal transmission mode, the main CPU 161 changes the operating mode of the composite device 100 according to the flow chart shown in FIG. 16 in step S207.

If the composite device 100 is set to the direct transmission mode, the main CPU 161 in the main control unit 160 examines the current strength of the available radio signal via the transmission control unit 150 in step S208.

When an "OK" signal is transmitted as a result of step S208, processing starting with step 210 is executed. However, if an "NG" signal is transmitted, the main CPU 161 displays a message indicating that condition (communication impossibility) or the like on the color LCD monitor 143 in the LCD unit 140 in step S209.

However, in step S209, instead of the display of communication impossibility, a user may be notified of the condition with an alarm sound or the like.

If the strength of the available radio wave is sufficient for transmission, a call is generated to a public network by the composite device 100, and reception is confirmed with steps S537 to S539 shown in FIG. 16 in step S210.

As the flow between this call generation and the public network connection and the process of negotiation with the destination server after the call is received differ depending on the communication method and protocol, a simple discrimination determines whether the destination server responds to the call or not. If the destination server does not respond to the call because the communication port of the server is in use, a busy message is returned to the composite device 100. In this is the case, the main CPU 161 signals the condition (communication impossibility) to a user using the display on the color LCD monitor 143 of the LCD unit 140, or by an alarm sound or the like in step S211. Thus, only if the call reception and negotiation proceed normally, and the communication between the composite device 100 and the transmission destination server is established, can the processing steps starting with the next step S212 be executed.

When the communication between the composite device 100 and the destination server is established by the call generation and call reception in step S210, the main CPU 161 in the main control unit 160 transfers the pickup image data within the flash memory 162 once to the buffer memory 163 in step S212.

The main CPU 161 then decomposes the pickup image data within the buffer memory 163 (assumed to be image data of JPEG type) into packets according to a protocol such as TCP/IP, and supplies those packet data to the communication unit 150 in step S213.

In the communication unit 150, the communication controller 151 converts the packet data from the main control unit 160 in accordance with the procedure determined by the type of a composite device 100 (here, assumed to be a transmission control procedure such as "PIAFS"), and stores the packet data after this conversion in the communication buffer memory 152 in step S214.

After conversion to a frequency band adapted to the device by means of the RF module 155, the packet data within the communication buffer memory 152 are transmitted to the base station via the antenna 156, and transmitted to the destination server through a public network in step S215.

In the server that received this, the pickup image is restored through the reverse procedure to correspond to the image in the composite device 100.

After the transmission of the packet data (pickup image data) within the communication buffer memory 152 ends, the main CPU 161 on the main control unit 160, having recognized this end, issues a request for disconnection to the communication controller 819 in the communication unit 150. As with the processing for call generation discussed above, the communication controller 819 ends communication processing in accordance with the specified procedure in step S216.

As mentioned above, in this embodiment, since the direct transmission mode is configured to initiate communication with the remote server via a public network automatically once the shutter 512 is depressed, and pickup images are automatically transmitted if the communication with the server is executable, a user can transmit the pickup image to a desired server by simply changing the mode of the composite device 100 to the direct transmission mode. Thus, every time a pickup image is transmitted, a user need not select a transmission image, change the mode to the direct transmission mode, select a destination server, or perform similar operations, unlike former devices.

If the composite device 100 is utilized for relay use or the like, i.e., if no pickup image always needs to be stored in the composite device itself 100, the process of writing to the flash memory 162 and reading from the flash memory 162 to the buffer memory 163 at steps S205 and S212 in FIG. 2 is unnecessary.

In such cases, for example, assuming that the buffer memory 163 is configured with a faster buffer memory, after configuration of the pickup image for transmission to a server directly through the communication unit 150, the memory region for image storage in the composite device 100 can be effectively used without waste.

Second Embodiment

In a second embodiment, in the direct transmission mode, the call generation and call reception processing is skipped if the time between a first depression of the shutter 512 to a second depression of the shutter 512 falls within a given range.

Figure 4:
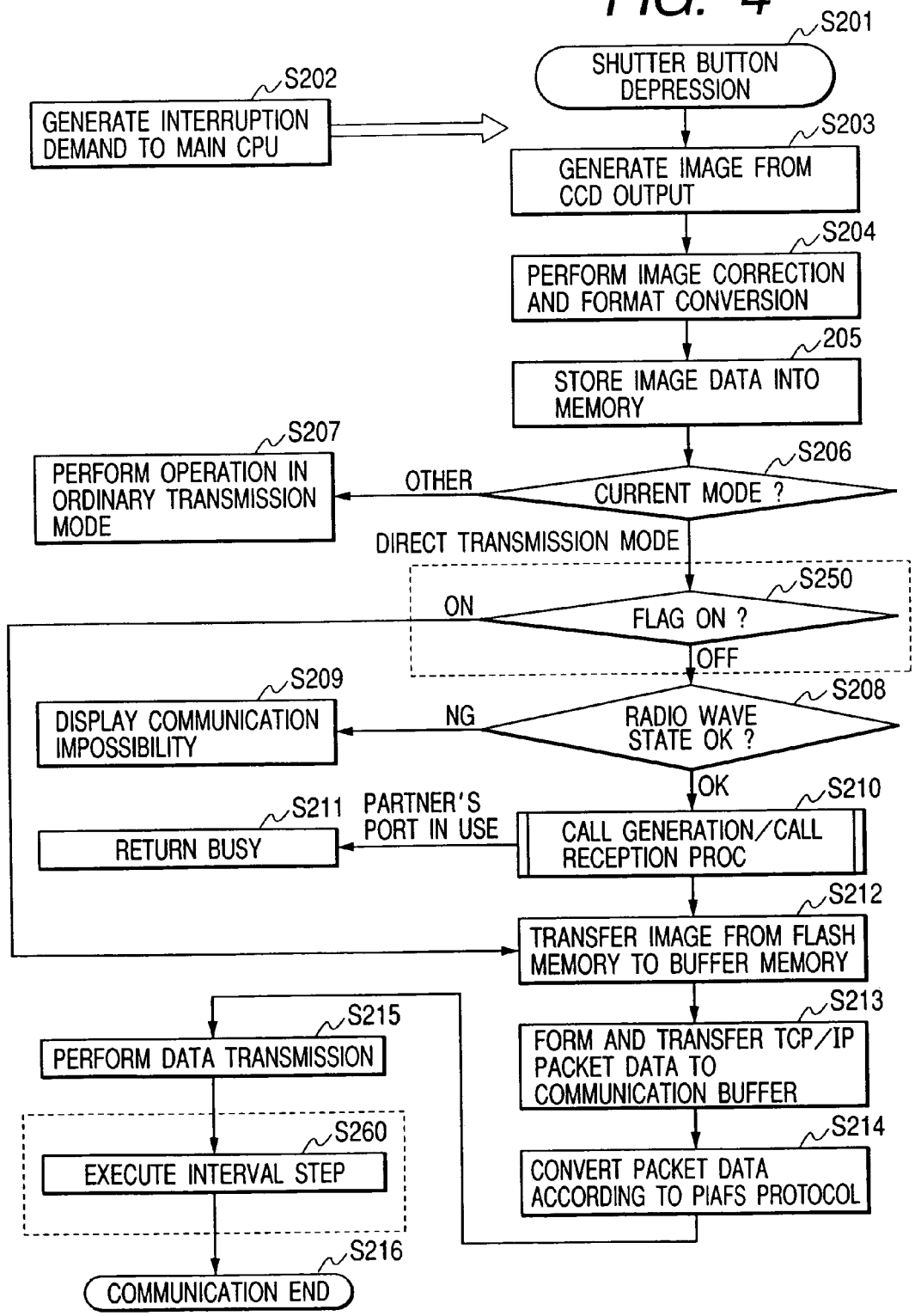
FIG. 4 is a flow chart f illustrating the transmission of a pickup image in the composite device in accordance with a second embodiment.

The processing in this embodiment from the pickup of an image to the transmission of the pickup image to a server with a composite device is shown in the flow chart of FIG. 4.

In the flow chart of FIG. 4, symbols for steps for executing a step similar to that of the flow chart of FIG. 2 and their detailed description are omitted. Here, a specific description will be made only of a configuration different than the first embodiment.

First, when the shutter 512 is first depressed, a pickup image is obtained as mentioned above, and the mode of the composite device 100 is the direct transmission mode in step S206, a determination of whether the discrimination flag is "ON" or not is made thereafter in step S250.

This flag (discrimination flag) is, for example, an inner flag of the main CPU 161 in the main control unit 160, and is set to "ON" or "OFF" in the interval step S270 discussed below with regard to FIG. 5. If the discrimination flag is "ON", step S208 to step S210 are canceled, and the processing steps starting with step S212 are executed.

When the shutter 512 is depressed for the first time, the discrimination flag is "OFF." Thus, as discussed above, call generation and call reception processing is carried out according to steps of S208 to S210, and the transmission of a pickup image to the server is executed if communication with the destination server is possible in step S215.

Figure 5:
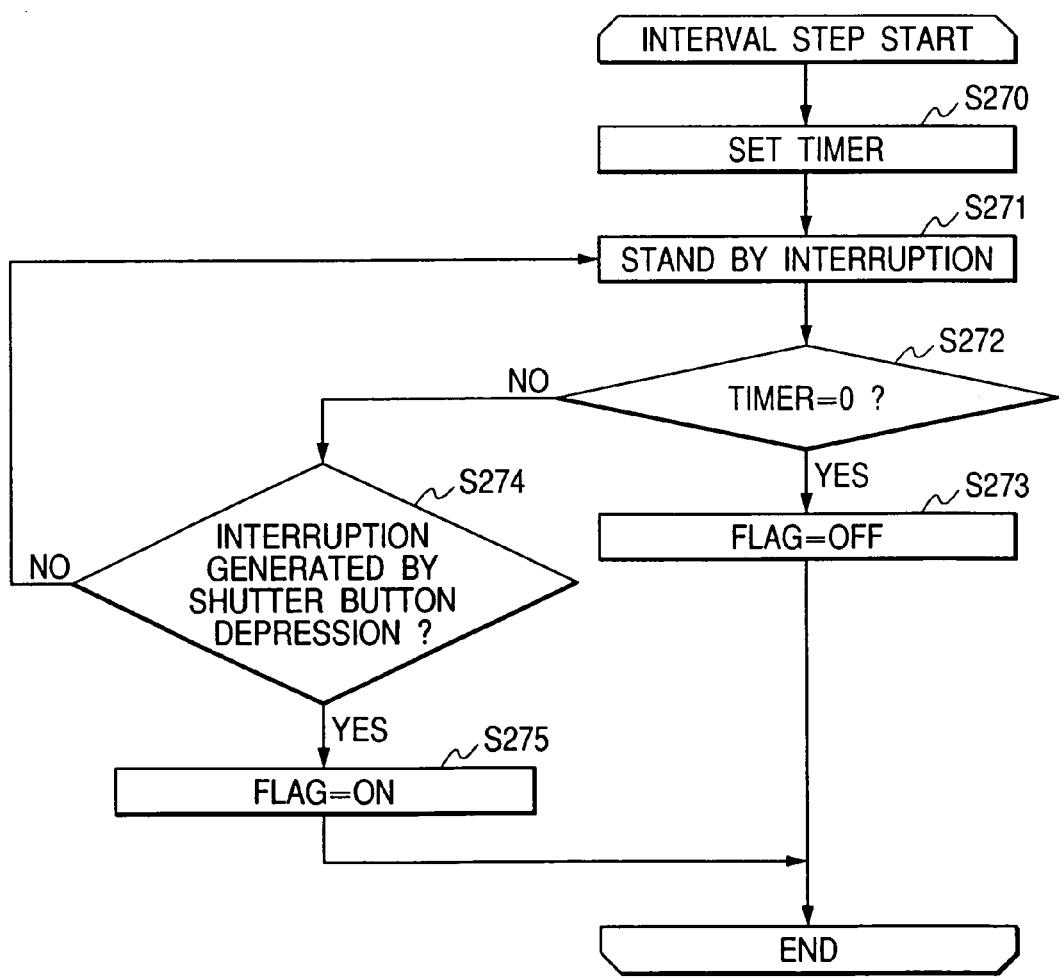
FIG. 5 is a flow chart illustrating the details of the processing of an interval step in accordance with the second embodiment.

Then, in the interval step of step S270, processing according to the flow chart of FIG. 5 is carried out.

Namely, in the main control unit 160, the main CPU 161 first sets the timer for a predetermined period of time in step S270, and waits for the occurrence of an interruption caused by a depression of the shutter 512 in step S202 in step S271.

Next, the main CPU 161 discriminates whether the time is "0" or not in step S272, and the discrimination flag is set to "OFF" if the time is 0 in step S273. Thereafter, this processing ends.

On the other hand, if the time is not 0, the main CPU 161 determines whether an interruption due to a depression of the shutter 512 has occurred in step S274. If an interruption occurs as a result of this discrimination, the main CPU 161 set the discrimination flag to "ON" in step S275. Thereafter, this processing ends. If no interruption occurs, the procedure returns to step S271, and the interruption waiting state appears.

Accordingly, when the shutter 512 is depressed a second time within the predetermined time set on the timer inside the main CPU 161 from the first depression of the shutter 512, the processing starting with step S201 is carried out in the "ON" state of the discrimination flag, and the discrimination of step S250 cancels the call generation and call reception at steps of S208 to S210, so that the transmission processing of a pickup image from step 212 is executed.

When the shutter 512 is depressed again after the lapse of a predetermined time set on the timer inside the main CPU 161 from the first depression of the shutter 512, the processing from the above-mentioned step S201 is carried out in the "OFF" state of the discrimination flag, and the discrimination of step S250 permits the call generation and call reception of steps S208 to S210 to be executed, as during the first depression of the shutter 512, so that the transmission processing of a pickup image starting with step 212 is executed.

As mentioned above, in this embodiment, the interval is provided only during a predetermined time after the end of the transmission of the pickup image to the transmission break.

The of the timer in the main CPU 161 for this purpose is considered in various ways by the CPU 161, depending on the use and circumstances, but its matching to the unit charging time of a network connection fee can reduce wasteful fees.

Figures 6A, 6B, 6C:
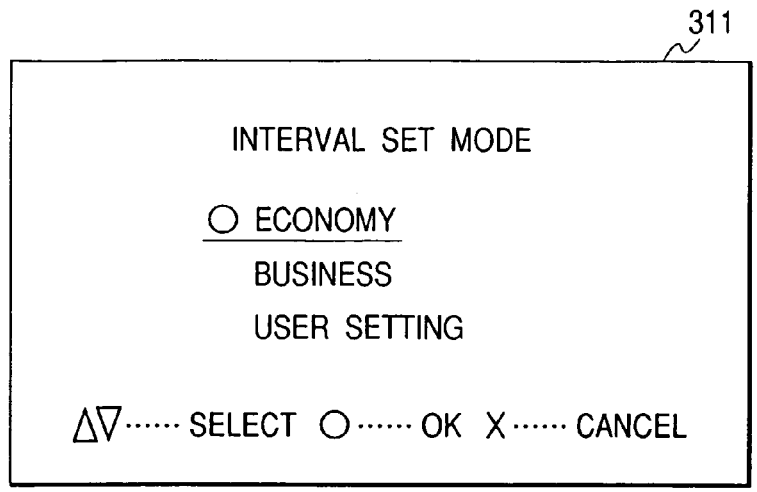
FIGS. 6A, 6B and 6C illustrate screens for the setup of the intervals.

Such being the case, FIGS. 6A, 6B and 6C show one example of a time spacing setting screen for the interval. The display of these screens is performed under control of the LCD controller 143 over the LCD monitor 141 in the LCD unit 140.

In FIGS. 6A, 6B and 6C, the first setting screen 311 is so configured that any one of economy priority mode (ECONOMY), business emphasis mode (BUSINESS) and user manual setting mode (USER SETTING) is selectable, depending on the needs of the user. Here, the screen state is shown in which a user selects the economy priority mode (ECONOMY).

The next setting screen 312 is used for selecting the economy priority mode (ECONOMY), and is configured so that a user can determine the minimum time for which a fee is charged, depending on the time and district, and can "OK" or "CANCEL" the connection. The numeral "45" indicated by the arrowhead 313 in FIG. 6B is the minimum amount of time charged, determined from the time and relative distance between the destination server and the composite device 100, and, in the economy priority mode (ECONOMY), that interval spacing is set at "45" seconds.

In the case of the use of the communication function of the composite device 100, the position of the user is not definite, and the relative distance to the server varies, so a user may set an estimated position, for example. In the case of using a PHS, a change in distance is automatically determined by the position information of CS.

The setting screen 314 is the screen used to select the business emphasis mode in which the availability and instantaneous response is considered more important than the economics, and is configured to allow a user to set the interval spacing with the interval kept always constant independent of the destination server.

In this mode, to enhance the instantaneous response, it is advisable to send out data directly from a buffer memory 163 without writing data into a flash memory 162 as mentioned above.

The user manual setting mode is not shown, but, based on a screen form intermediate between the above-mentioned setting screens 312 and 314, it is configured to allow a user to set a longer interval time for a server in the same district, to set a shorter interval time for a server in a far district, or to change the setting, depending on the destination server.

According to this embodiment, as mentioned above, if another pickup image is transmitted at once after the completion of transmitting a certain pickup image in the direct transmission mode, the connection to a public network is not broken, so long as the elapsed time is within the interval time, so that the preprocessing required at the time of a normal connection (recalling to a public network, negotiation, connection processing to the destination server and the like) can be automatically skipped.

Thus, the time for the preprocessing for the connection to a public network can be omitted, and the image transmission can be effectively carried out. Furthermore, missing the opportunity for a photograph can be prevented.

An appropriate selection of the interval time provides compatibility between economics and an instantaneous response. In the description above, measuring the time of the interval starts after the end of the transmission, but it is more economic from the viewpoint of the fee system, where a fee is charged for a definite interval of time after the start of the transmission, to break the communication directly before an additional fee is charged. For this purpose, it is effective to judge the break of communication at interval of time after the start of the transmission.

Third Embodiment

In the first embodiment, as shown in FIG. 2, if the strength of the available radio signal is bad, and the transmission is impossible or unstable (that is, the result of a discrimination at step S208 is "NG") when the image pickup unit 110 is in the direct transmission mode, and is instructed to transmit a pickup image to a server, a message or similar communication of the impossibility of transmission is displayed on the color LC 143.

If this is the case in this embodiment, pickup images to be transmitted (untransmitted images) are stored once in a memory, the transmission state returns to the photographic state before the completion of the transmission processing of untransmitted images, and the untransmitted images stored in the memory are automatically retransmitted when the radio signal is stabilized.

Configuring the hardware and software for implementing this makes it unnecessary for a user to wait for an improvement in the radio signal, allows the photographing of a subject before the completion of a transmission, and makes moving to a place where the radio signal is good for the transmission unnecessary, so that photographing a subject is possible even before the radio signal is recovered. In other words, a bad radio signal does not interfere with a users ability to take photographs.

Hereinafter, one example of this embodiment will be described.

First, the hardware is fundamentally the same as that shown in FIGS. 1A and 1B, but the capacity of the buffer memory 163 in the main control unit 160 is greater than that in the first embodiment. This is because the buffer memory 163 is also used as an image data buffer for storing untransmitted images in this embodiment, whereas it is chiefly used as a work area in the main CPU 161 in the first embodiment.

Here, the reason of using a buffer memory 163 rather than a flash memory 162 as the memory for storing the untransmitted image once is that faster access to the buffer memory 163 is possible compared to the access to the flash memory 162, and the elapsed time before the release of a device (restoration to the photographing state) is shortened by this improved speed. Besides, the buffer memory 163 is not necessarily used only for image transmission, but also as a simple image buffer, and, accordingly, becomes effective as a so-called snapshot buffer.

The use of the buffer memory 163 is faster than the use of the flash memory 162, but does not prevent the use of the flash memory 162. If the flash memory 162, which has a low unit capacity price, is employed as the memory for storing untransmitted images once, more time is required for storing an untransmitted image in the flash memory 162, but the advantage of being able to store more images at a lower cost cannot be disregarded.

In this embodiment, a buffer memory 163 or a flash memory 162 is used as the memory for storing untransmitted images once, but the present invention is not limited to a buffer memory 163 or a flash memory 162. For example, a dedicated memory for storing untransmitted images once may be provided.

Figure 7:
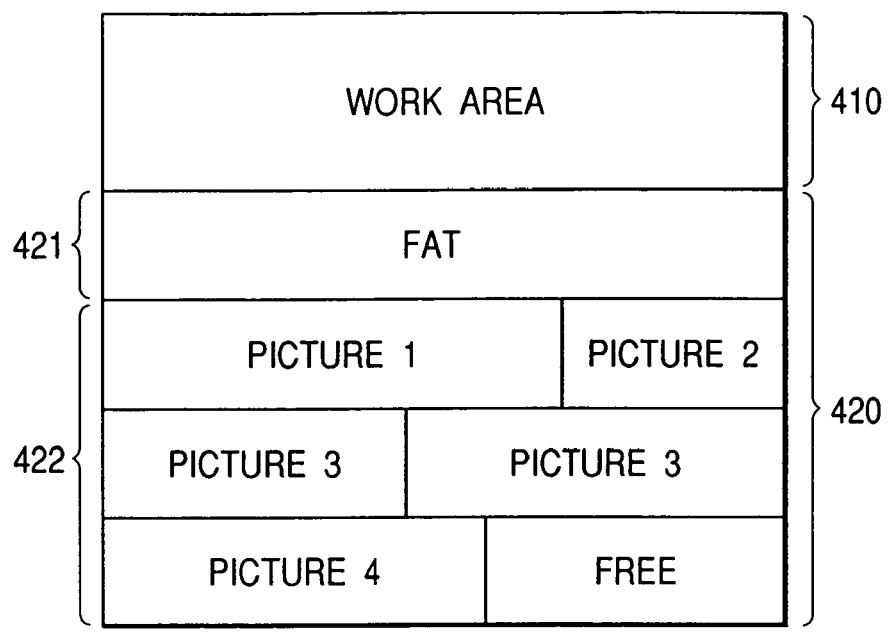
FIG. 7 is an illustration of the memory map of a buffer memory in the composite device for storing the pickup image once in the case where transmission of the pickup image is not possible in a third embodiment of the invention.

In such a case, the buffer memory 163 here is made up of different areas, as shown in the memory map in FIG. 7.

To be specific, the buffer memory 163 is broadly divided into a work area 410 and a data area 420, as shown in FIG. 7.

The work area 410 is a memory area used in the packing, unpacking, or the like of images, as described in the first embodiment, and its fundamental uses are also similar in this embodiment.

The data area 420 is a memory area added in this embodiment for the continuous and rapid storage of photographed images (photographic images), converted into a given format in the work area 410 within the capacity of the relevant memory.

The data area 420 is further divided into a memory area 421 for storing a file administrating table (FAT) and the like and a memory area 422 for storing image data and the like.

In the memory area 421, as shown in FIG. 8, for example, information items regarding various image files (photographic images) are stored in a FAT. In addition to the information comprising serial numbers 431, final dates 432, start addresses 433, and end addresses 434, photographic data 435, such as photographic resolution, shutter speed, and the diaphragm setting may also be stored, depending on the image pickup device.

Typically, one transmission WAITING flag 435a is added to the data for each photographic image in photographic data zone 435.

This transmission WAITING flag 435a is added in the direct transmission mode, but ignored in the other modes, thus providing priority to the ordinary processing of the photographic buffer. Thus, transmission of the WAITING flags 453a varies with the radio signal strength during photography in the direct transmission mode.

FIG. 9 is a flow chart showing the processing required to set the transmission WAITING flag 435a. This processing is executed, for example, by the main CPU 161.

First, during the processing shown in FIG. 2, if the radio signal strength results in an NG condition at the time of image transmission as a result of the discrimination in step S208 in step S441, the pickup images stored in the flash memory 162 are once copied to the data area 420 of the buffer memory 163 in step S442.

This step comes directly after the capture of an image, but is not limited to this before pickup images are stored in the flash memory 162.

Next, the transmission WAITING flag 435a, corresponding to the pickup image copied to the data area 420 of the buffer memory 163 at step S442 is set to "ON" in step S443.

Using functions discussed below with regard to a composite device 100, the user is notified of the presence of transmission WAITING images (untransmitted images) in step S444, and this transmission state is immediately changed to the normal photography state in step S445.

Examples of how the composite device 100 may notify the user of the WAITING flag 435a in step S444 and how many untransmitted images remain on a color LC 143 while untransmitted images are stored in memory include the display of icon(s), a blinking LED, and the like.

Here, for example, the presence or absence of untransmitted images remaining on a color LC 143 is displayed using icon(s).

Figure 10:
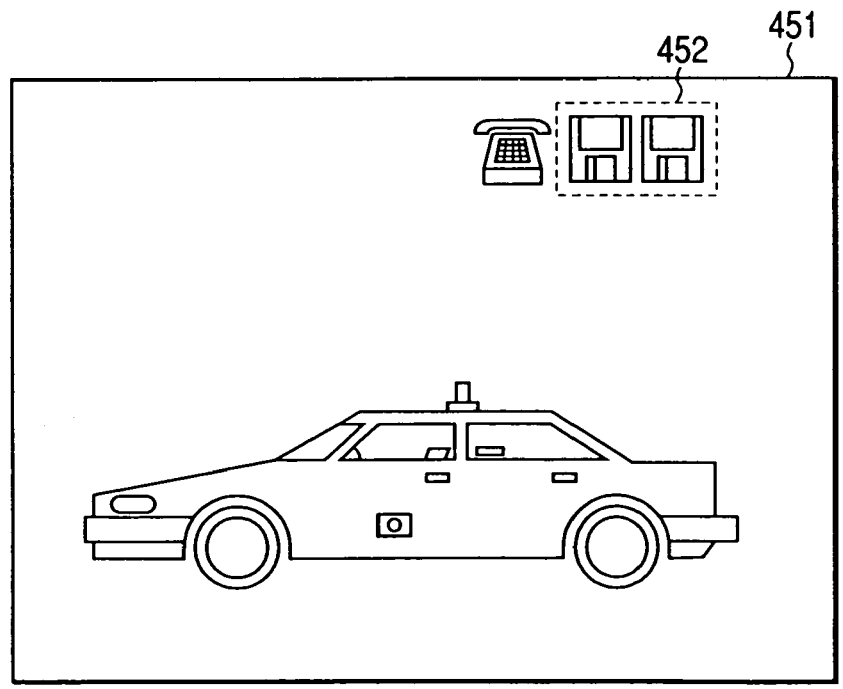
FIG. 10 is an illustration of one example of a function for notifying a user about the presence of a Transmission WAIT screen.

According to this embodiment, on the color LC 143, as shown in FIG. 10, two icons indicating that two untransmitted images remain are displayed in the upper zone 452 of the area 451. These icons indicate stored untransmitted images, and the number of icons increases as the number of untransmitted images increase. Once the relevant untransmitted image has been transmitted, the user is notified of the state of each untransmitted image by a change in the icon, such as blinking or the like.

As mentioned above, here, in case of bad radio signal, such that communication is impossible or unstable, untransmitted images are stored once in the buffer memory 163, and the transmission state returns to the photographic state before the completion of the transmission of untransmitted images. As a result, a user can keep taking photographs smoothly even in case of a bad radio signal.

The untransmitted images stored in the buffer memory 163 are automatically retransmitted when the radio wave state is recovered.

Figure 11:
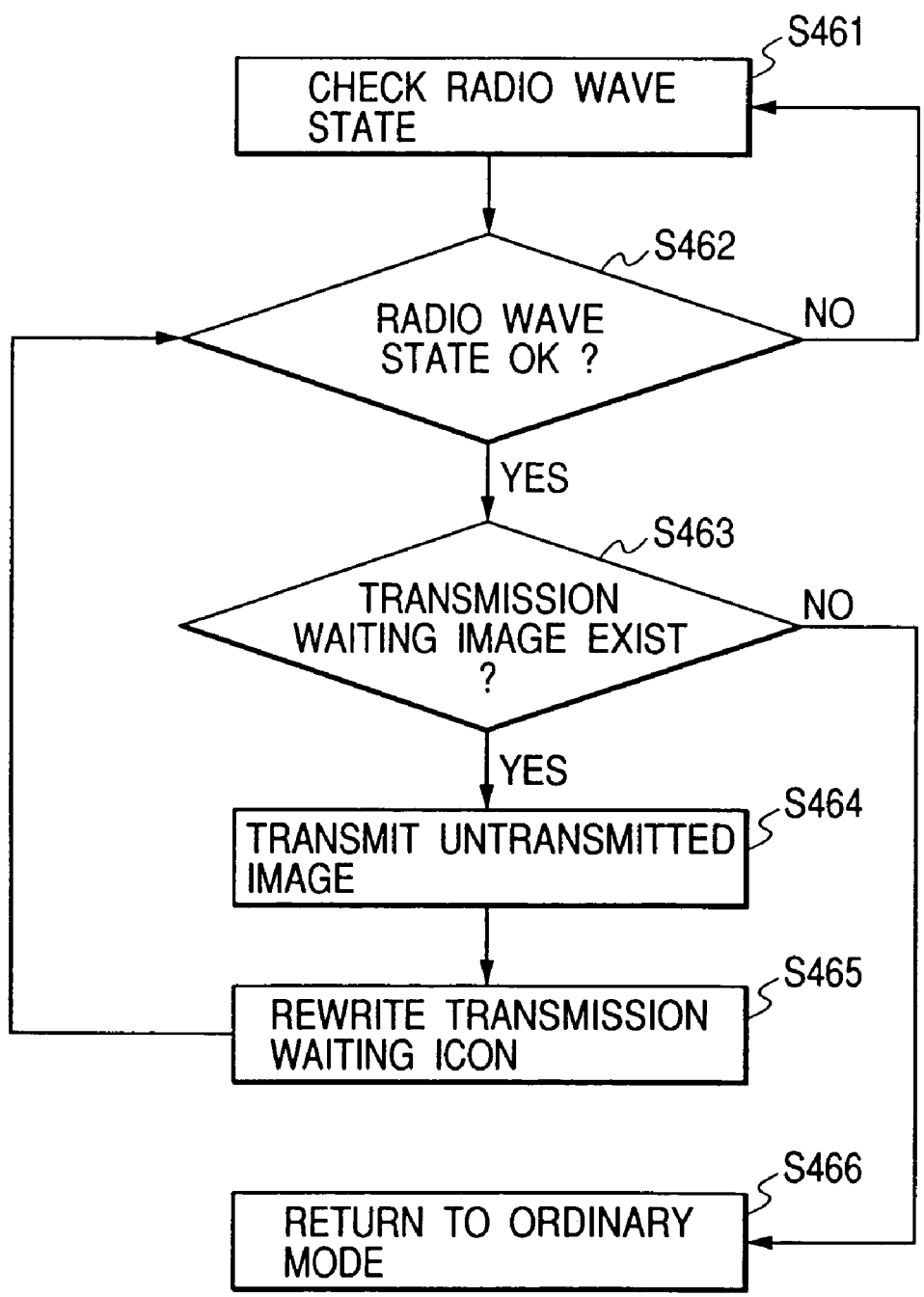
FIG. 11 is a flow chart illustrating the processing for the automatic transmission, where the transmission of a pickup image stored once in the buffer memory becomes possible.
Figure 12:
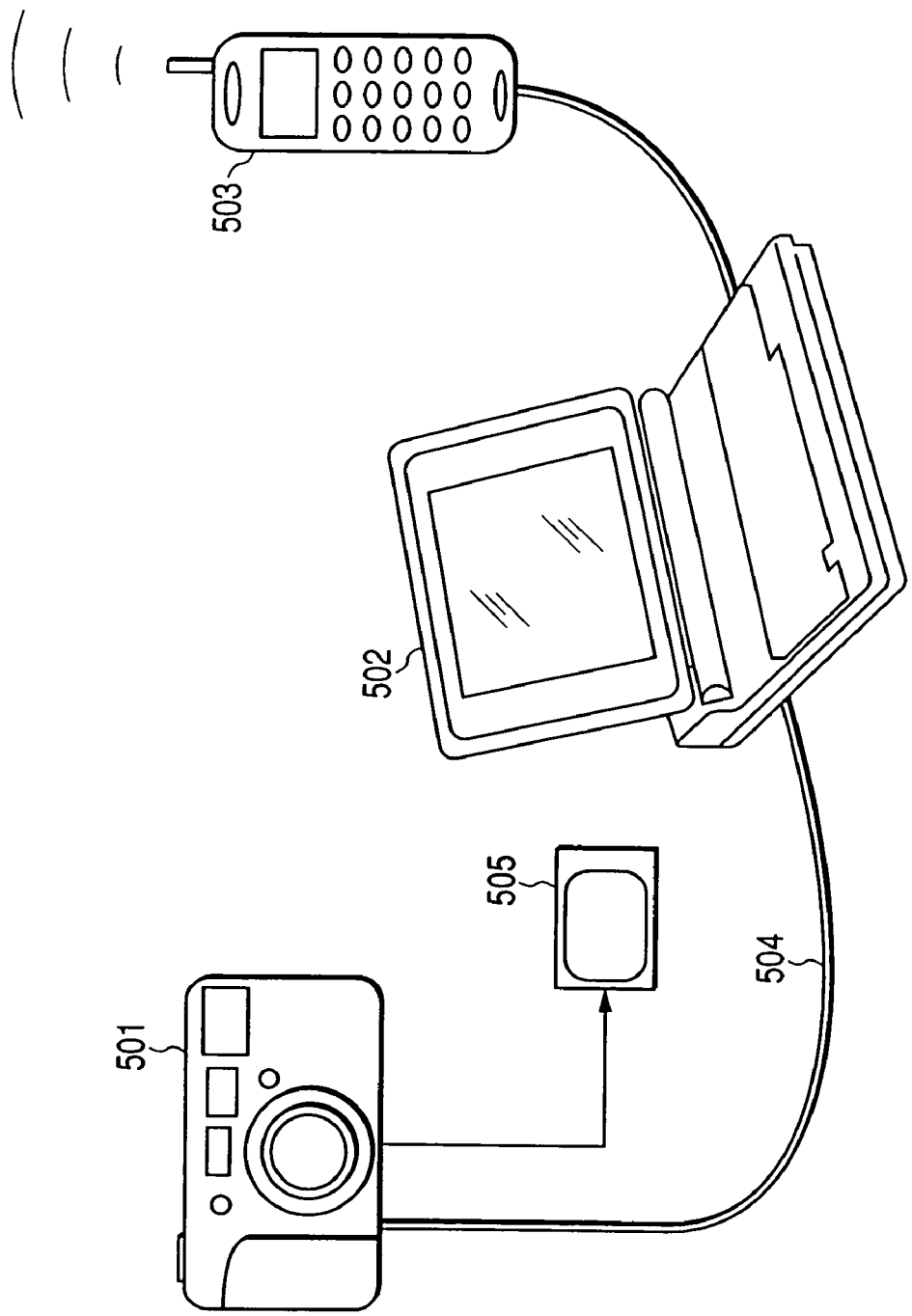
FIG. 12 is an illustration of a prior art method for transmitting a pickup image obtained in a pickup device by means of a communication device.
Figure 13:
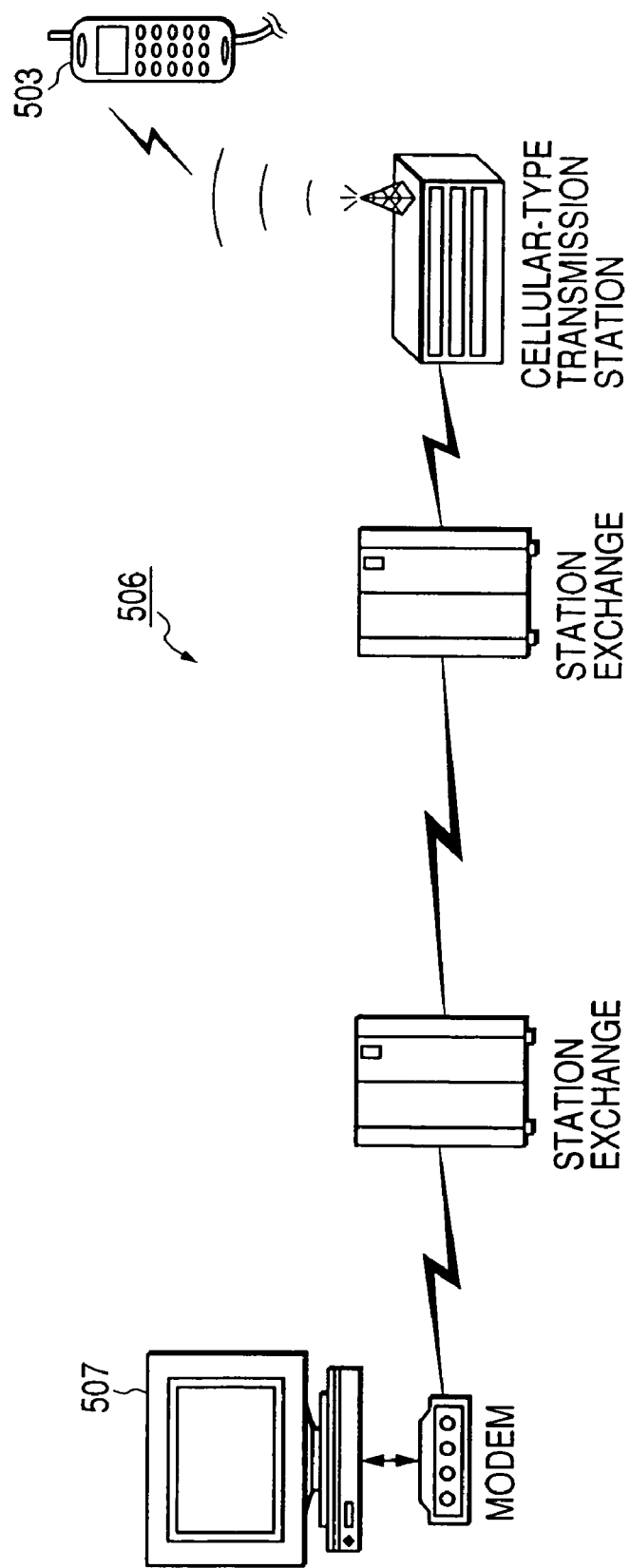
FIG. 13 illustrates the transmission of a pickup image to a server by means of the communication device.

Accordingly, as mentioned above, the communication control unit 151 for monitoring the radio signal strength always exchanges information about the strength of the radio signal with the main CPU 161, and the main CPU 161 determines, based on information from the communication control unit 151, whether communication is possible or not. In addition, in this embodiment, the main CPU 161 monitors the respective transmission WAITING flags 435a provided for individual pickup images stored in the buffer memory 163, and automatically executes the processing required for a transmission as shown in FIG. 11 when the radio signal becomes sufficient for transmission, and at least one of the transmission WAITING flags 435a indicating stored transmission WAITING images (images of flag="ON") remains.

In the transmission processing, first, the communication control unit 151 checks the radio wave state in step S461, determines whether the radio signal has recovered in step S462, and issues an interruption demand to the main CPU 161 if the signal has recovered.

If it is determined that the radio signal has not yet been restored in step S462, the communication control unit 151 continues to monitor the radio signal strength.

By checking the transmission WAITING flags 435a for individual pickup images after receiving the interruption from the communication control unit 151, the main CPU 161 determines whether transmission WAITING images (images of flag="ON") remain or not in step S463.

If it is determined that no transmission WAITING image (image of flag="ON") remain, i.e., if all transmission WAITING flags 435a are "OFF", in step S463, the mode is changed to the ordinary mode in step S466.

On the other hand, if it is determined in step S463 that transmission WAITING images (images of flag="ON") remain, the main CPU 161 proceeds to the multi task mode by the pause or division of the processing in execution in step S464.

This multi task mode is a mode in which transmission of untransmitted images is processed in parallel with the processing of ordinary photographing, perusal and the like. As methods for implementing this, various methods are considered depending on the type of a CPU, the hardware and the software.

When the transmission of a previously untransmitted image is complete, the main CPU 161 sets the transmission WAITING flag 435a corresponding to the relevant image to "OFF" in step S464.

Simultaneously, the main CPU 161 executes the processing required to eliminate the icons indicating the presence of untransmitted images on the color LC 143, as shown in FIG. 10, from the relevant screen in step S465.

Following the execution of step S465, step S462 is again executed. Namely, the processing required for steps of S462 to S465 is repeated and executed until all transmission WAITING flags 435a provided for individual pickup images stored in the buffer memory 163 are turned "OFF."

Accordingly, the processing described above enables a user to continue photographing regardless of the strength of the radio signal. Thus, the convenience of the third embodiment, is enhanced is relative to that of the first embodiment.

As described above, a composite device in which image pickup means and communication means are integrated is used. However, in the present invention a communication device may also be connected to an image pickup device through a cable or the like. In this case, if transmission of the images is not required, no communication device is necessary, and it is only necessary to carry the image pickup means alone, reducing the weight of the items be carried.

The purpose of the present invention may also be attained by supplying a storage medium on which the program codes of the software for implementing the function of the host and terminal in the individual embodiments mentioned above are stored to a system or device, and allowing the computer (or CPU or MPU) of the system or device to read and execute the program codes stored in the storage medium.

In this embodiment, the program codes themselves are read from the storage medium, and implement the function of each embodiment, and the storage medium in which the program codes are stored constitutes the present invention.

As storage media for supplying a program code, ROM, a floppy disk, a hard disk, an optical disk, a photomagnetic disk, a CD-ROM, a CD-R, a magnetic tape, a nonvolatile memory card and the like can be used.

Not only the function of each embodiment is implemented by executing the program codes read out by a computer, but, in the case where an OS or the like operating on the computer performs a part or the whole of an actual processing based on the instruction of the program codes, the function of each embodiment implemented by the relevant processing is also included in the invention.

In the case where a program code, read from a storage medium is written into an extended function board inserted in a computer or a memory, provided on an extended function unit connected to a computer, then, based on the instruction of the program code, a CPU or the like provided on the extended function board or the extended function unit performs a part or the whole of an actual processing, and the function of each embodiment implemented by the relevant processing is also included in the invention.

In the present invention, as described above, an image pickup operation and a communication with a specified transmission destination (such as radio transmission) is started on the basis of the instruction of a predetermined operation given by a user. Thereby, the pickup images obtained by the image pickup operation are automatically transmitted.

After the lapse of a predetermined time (a definite interval) from the end of transmission to a specified transmission destination, a communication break with the transmission destination (release of connection to the communication network) is made.

Specifically, when a predetermined operation with a switch is performed by a user, for example, the operating mode of the device is switched to a predetermined mode. On depressing the shutter, the device, in a predetermined mode, starts an image pickup of a subject, and, simultaneously, initiates radio communication with a preset transmission destination (starts an image pickup operation and a communicating operation at the same time). Thereby, the pickup images obtained by an image pickup are automatically transmitted to a preset transmission destination.

According to this embodiment, a user can simultaneously send the pickup images obtained by photographing an image to a desired transmission destination by simply switching the operating mode of the device to a predetermined mode.

Thus, unlike the former case, a user need not repeatedly perform the selection of a transmission image, the change to the transmission mode, the selection of a transmission destination, and the like each time a pickup image is transmitted. Consequently, even in the case of successive transmissions during continuous photography, an effective transmission of pickup images can be carried out without once interrupting the photography, and without missing the opportunity for a photograph.

At the end of the transmission of pickup images to a transmission destination, the communication with the destination is not simultaneously broken, but is terminated after a predetermined interval. Thereby, if the shutter is depressed within the predetermined interval, the generation of a call is not required before the transmission of the next pickup image.

According to this embodiment, in case of the transmission of another pickup image immediately after the end of the transmission of a previous pickup image, the preprocessing (recall generation to a public network and negotiation, processing of connection to a destination server and the like) required at the time of the ordinary connection can be automatically skipped because the connection to the public network is not broken within the predetermined time interval.

Thus, the preprocessing of the connection to a public network, generally taking much time, can be omitted, and image transmission can be effectively made. This is especially effective at the time of continuous photography, such that lost opportunities for photographs are prevented.

Furthermore, the selection of a predetermined time interval permits the choice of making either cost or instantaneous response the priority.

In addition, if the communication state (radio signal strength for wireless transmission) is unsuitable for transmitting a pickup images to a destination server (when an instruction of transmission was made), the pickup images (untransmitted images) may be stored into a memory, enabling a user to continue photographing without the need of waiting until the radio signal is recovered, and without needing to move to a place having a good radio signal. Furthermore, the invention may be configured to automatically transmit the pickup images stored once in a memory when the radio signal is restored to a state suitable for the communication, enhancing the convenience of the invention.

Thus, the present invention enables a user to continue to take photographs, regardless of the strength of the radio signal, further enhancing the convenience of the invention.

What is claimed is:

1. A communication device connected to an image pickup unit for photographing a subject, said device comprising:
 an input unit adapted to input images from the image pickup unit;
 a communicative unit adapted to transmit the pickup images inputted by said input unit to a transmission destination in communication therewith; and
 a control unit adapted to start an operation of said communicative unit in response to the image pickup operation of the image pickup unit,
 wherein said control unit controls said communicative unit so as to make a break in communication with the transmission destination after a lapse of a predetermined time period from the time when the transmission of the pickup image is completed,
 wherein the lapse of the predetermined time period can be arbitrarily set by a user, and
 wherein setting of the lapse of the predetermined time period is performed by selecting from among plural modes displayed on a display unit.

2. An image pickup unit having a communicative function to transmit pickup images obtained by picking up images of a subject, said unit comprising:
 a manipulative unit adapted to instruct a predetermined operation; and
 a control unit adapted to start the image pickup operation and an operation of the communicative function on the basis of the instruction of a predetermined operation by said manipulative unit,
 wherein said control unit controls execution of the communicative function so as to make a break in communication with a transmission destination after a lapse of given time a predetermined time period from the time when the transmission of the pickup image is completed,
 wherein the lapse of the predetermined time period can be arbitrarily set by a user, and wherein setting of the lapse of the predetermined time period is performed by selecting from among plural modes displayed on a display unit.

3. A storage medium in which a processing step for transmitting pickup images obtained by photographing a subject to a specified transmission destination is stored so as to be readable by a computer, wherein said processing step includes a step of starting an image pickup operation of picking up the image of the subject and a communicating operation with the transmission destination on the basis of instructions of a predetermined operation given from a user to transmit the pickup images obtained by the image pickup operation to the transmission destination, wherein said processing step further includes a step of making a break in communication with the transmission destination after a lapse of a predetermined time period from the time when the transmission of the pickup image is completed, wherein the lapse of the predetermined time period can be arbitrarily set by the user, and wherein setting of the lapse of the predetermined time period is performed by selecting from among plural modes displayed on a display unit.

4. A communication method for communicating photographic images from an image pickup unit for picking up images of a subject to a transmission destination, said method comprising:

an input step of inputting a photographed image;

a communicative step of transmitting the photographic image inputted in said input step to the transmission destination in communication therewith; and a control step of starting execution of said communicative step in response to the image pickup operation of the image pickup unit, wherein said control step includes controlling execution of said communicative step so as to make a break in communication with the transmission destination after a lapse of a predetermined time period from the time when the transmission of the photographic image is completed, wherein the lapse of the predetermined time period can be arbitrarily set by a user, and wherein setting of the lapse of the predetermined time period is performed by selecting from among plural modes displayed on a display unit.

* * * * *

UNITED STATES PATENT AND TRADEMARK OFFICE
CERTIFICATE OF CORRECTION

| | |
|---|---|
| PATENT NO. | : 7,062,230 B2 |
| APPLICATION NO. | : 09/406697 |
| DATED | : June 13, 2006 |
| INVENTOR(S) | : Satoshi Ishiguro et al. |

It is certified that error appears in the above-identified patent and that said Letters Patent is hereby corrected as shown below:

COLUMN 2

Line 31, "NO," should read --NG,--.

COLUMN 4

Line 51, "chart f" should read --chart--.

COLUMN 10

Line 18, "set" should read --sets--.

COLUMN 14

Line 48, "is relative" should read --relatively--.

COLUMN 16

Line 15, "a pickup" should read --pickup--.

Signed and Sealed this

Twenty-sixth Day of December, 2006

JON W. DUDAS
*Director of the United States Patent and Trademark Office*